(12) United States Patent
Giraldo-Wingler et al.

(10) Patent No.: US 11,085,697 B2
(45) Date of Patent: Aug. 10, 2021

(54) DRYING OF ORGANIC MATERIALS

(71) Applicants: Nicolas Enrique Giraldo-Wingler, Robbinsville, NJ (US); NUORGANICS LLC, Robbinsville, NJ (US)

(72) Inventors: Nicolas Enrique Giraldo-Wingler, Robbinsville, NJ (US); Eugenio Giraldo, Robbinsville, NJ (US)

(73) Assignees: Nicolas Enrique Giraldo-Wingler, Robbinsville, NJ (US); NUORGANICS LLC, Robbinsville, NJ (US)

( * ) Notice: Subject to any disclaimer, the term of this patent is extended or adjusted under 35 U.S.C. 154(b) by 140 days.

(21) Appl. No.: 14/269,181

(22) Filed: May 4, 2014

(65) Prior Publication Data
US 2015/0316319 A1    Nov. 5, 2015

(51) Int. Cl.
 *F26B 23/00* (2006.01)
 *F26B 3/32* (2006.01)
 *F26B 1/00* (2006.01)
 *F26B 25/00* (2006.01)

(52) U.S. Cl.
 CPC .............. *F26B 23/007* (2013.01); *F26B 1/00* (2013.01); *F26B 3/32* (2013.01); *F26B 23/002* (2013.01); *F26B 23/005* (2013.01); *F26B 25/006* (2013.01); *F26B 2200/02* (2013.01); *F26B 2200/18* (2013.01); *F26B 2200/24* (2013.01); *Y02B 30/52* (2013.01); *Y02P 70/10* (2015.11)

(58) Field of Classification Search
 CPC .................................................. C05F 17/0205
 USPC .................................. 34/282, 477; 435/290.1
 See application file for complete search history.

(56) References Cited

U.S. PATENT DOCUMENTS

| 4,223,266 | A | * | 9/1980 | Scannell | G01D 11/16 324/151 A |
|---|---|---|---|---|---|
| 5,079,852 | A | * | 1/1992 | Nakayama | C02F 11/12 110/234 |
| 5,256,378 | A | * | 10/1993 | Elston | C05F 3/04 210/603 |
| 5,693,528 | A | * | 12/1997 | Grabbe | C05F 17/0072 435/286.6 |
| 8,869,420 | B1 | * | 10/2014 | Nazhad | F26B 21/08 110/342 |
| 2008/0229610 | A1 | * | 9/2008 | Ronning | F26B 11/0413 34/514 |
| 2009/0277040 | A1 | * | 11/2009 | Schu | B03B 9/06 34/387 |
| 2013/0025153 | A1 | * | 1/2013 | Mengat | F26B 17/20 34/282 |
| 2013/0125412 | A1 | * | 5/2013 | Haarlemmer | C02F 11/12 34/477 |
| 2015/0000156 | A1 | * | 1/2015 | Kumar | F26B 3/12 34/477 |

* cited by examiner

*Primary Examiner* — Nina Bhat
(74) *Attorney, Agent, or Firm* — Lando & Anastasi, LLP

(57) ABSTRACT

Described is a method and apparatus for drying organic material using the energy contained in the organic material to be dried to drive the drying process. The organic material could be sewage sludge, food scraps, manure, wood, bagasse etc. The latent heat of evaporation is recovered through the use of a heat pump mechanism. This allows for the retention of a majority of the heat within the system, allowing optimal drying conditions to be maintained throughout the drying process.

15 Claims, 11 Drawing Sheets

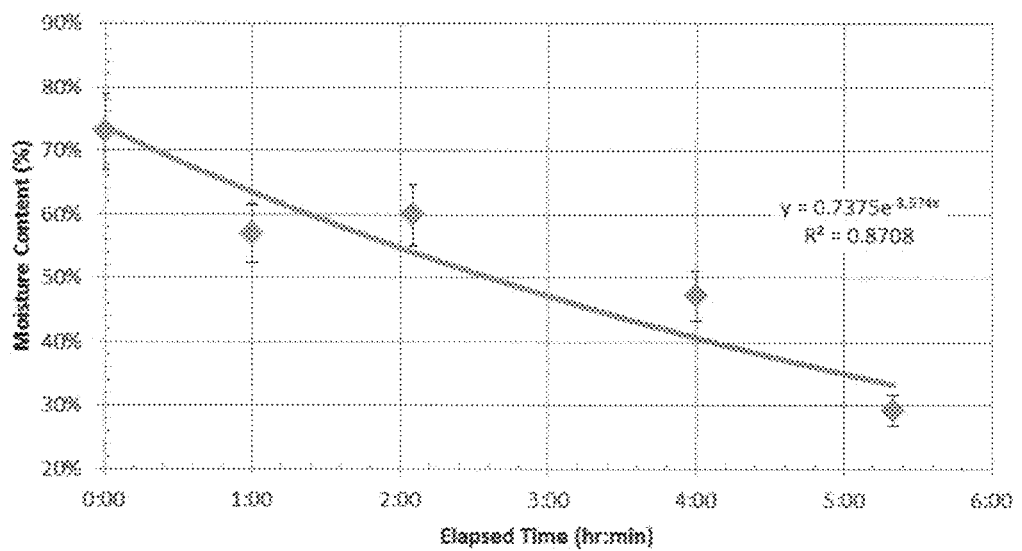
Figure 9. Drying of Food Waste in Prototype

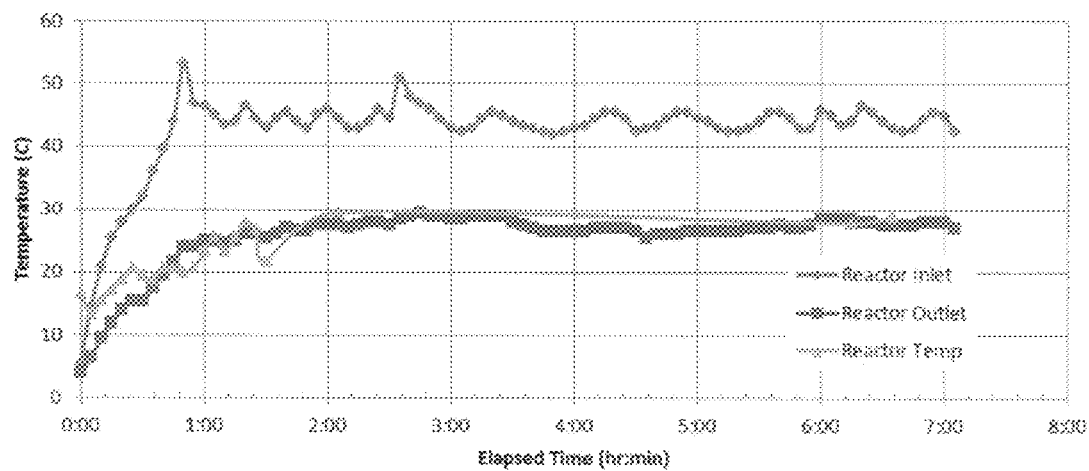
Figure 10. Temperatures during Food Waste Drying in Prototype

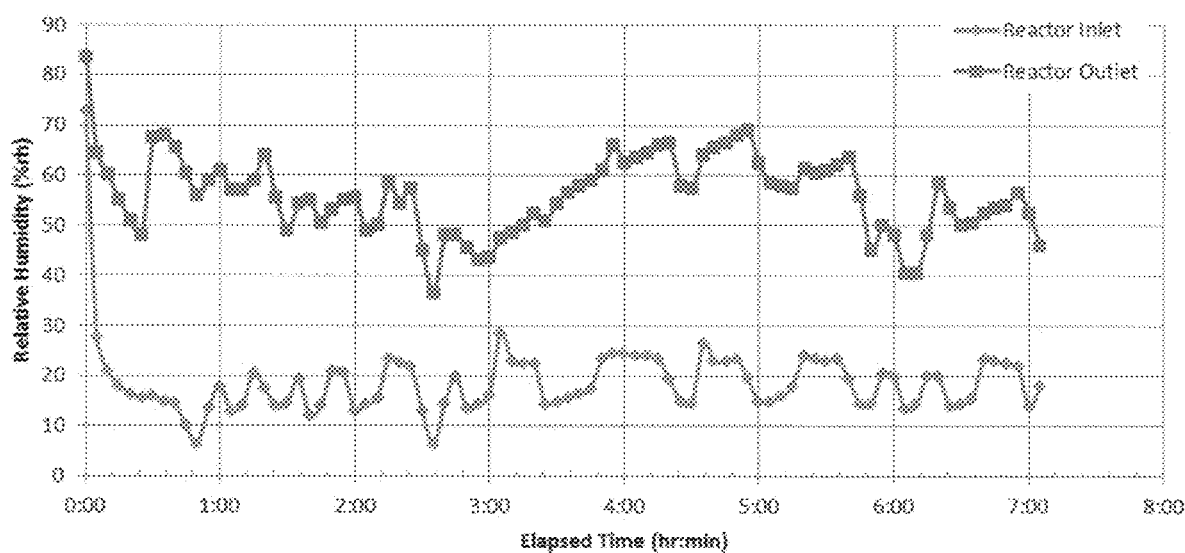
Figure 11. Relative Humidity of Circulating Air during Food Waste Drying in Prototype

DRYING OF ORGANIC MATERIALS

The drying of waste organic materials has long been a topic of interest among scientists and engineers, due to the benefits associated with it, among which are decreased transportation costs and potential for combustion or other thermal processes. However, the energy cost associated with thermally drying waste organic materials often outweighs the potential benefits.

The biodrying process offers a unique drying solution for applications in which the liquid being removed is water, and the material being dried is biodegradable. In biodrying, the latent heat of evaporation required for the drying is provided by biological activity in the substrate. The following reaction illustrates that concept: Biodegradable Organic Matter+ Oxygen+Microorganisms=Water+Carbon Dioxide+Ammonia+Heat. This process is sped up by constant, controlled aeration, which also provides convective moisture removal. However, vapor removal cools off the reacting mixture, slowing down the biological process and limiting the drying rate and pathogen inactivation. Also, as the material dries beyond 50% solids biological activity is dramatically reduced, reducing water evaporation rate, and further gains in solids content are very slow and costly. As a result, drying times in Biodrying reactors are long, increasing capital and operational costs. Furthermore, in the biodrying process, ammonia generated in the decomposition or organic matter and incorporated in the gas stream used for aeration is usually discharged to the atmosphere creating odor and environmental impacts.

Existing biodrying technologies make use of a number of configurations to minimize these downsides while still meeting design specifications. However, these solutions require a sacrifice in the form of energy, residence time, or pathogen removal. Open, windrow-type reactors such as those employed by Herhof since the mid 1990's (1) are easy to retrofit onto existing composting operations and can handle very large quantities of substrate at the cost of lower efficiency values and non-uniform drying. Closed-type batch reactors with carefully-controlled forced aeration and no mechanical agitation such as those designed by Zawadska and Frei (2) (3) require little energy investment, but are limited by the amount of drying they can achieve, reaching a maximum of about 50% moisture removal without significantly increasing energy demand. Closed, batch systems with mechanical agitation such as the rotating drum used by Future Fuels (1) or the auger-mixed reactor designed by Choi et al (4) require an energy investment in the form of amendments to reach efficient drying temperatures. Continuous systems, such as the one designed by Navaee-Ardeh et al (5) (6) and Frei et al (3) achieve a good balance between product uniformity and moisture content, but fail to maintain high enough temperatures for pathogen removal making them less useful in processes for which this is necessary.

Despite the number of biodrying reactor configurations developed to this day, there has been little to no regard to improving the thermodynamics of the process in their design. The proposed invention seeks to fix this issue through the recovery and return of the latent heat of evaporation of the liquid being removed to the reacting mass. The heat of vaporization is the largest contributor to the total enthalpy of the moist gas removed from a Biodrying process, see FIG. 7. It is observed that for temperatures between 35 and 60 degrees centigrade 70 to 90% of the total enthalpy is in the form of latent heat of vaporization. Recovering and recycling this heat enables greater ventilation rates without cooling the mass, significantly reducing the drying time, and obtaining a drier product. Furthermore, due to the heat recovery leas of the organic matter energy is necessary for drying and consequently there is a conservation of the energy in the dried product, producing a more energetic biofuel. FIG. 8 illustrates the impact of the present invention, in the amount of energy required to dry the product as function of different initial moisture contents. It is observed that this invention dramatically reduces the amount of biological decomposition needed for drying.

1. Biodrying for mechanical biological treatment of wastes A review of process science and engineering. Veils et al, 2009, Bioresource Technology, pp 2747
2. Biodrying of Organic Fraction of Municipal Solid Waste. Zawadska et al, 2010, Drying Technology, pp 1220
3. Novel Drying Process Using Forced Aeration through a Porous Biomass Matrix, Frei et al., 2004, Vol 22, 1191
4. Composting of High Moisture Materials, Biodrying Poultry Manure in a Sequentially Fed Reactor, Choi el al., 2001, Compost Science and Utilization, 303
5. Key Variables Analysis of a Novel Continuous Biodrying Process for Drying Mixed Sledge. Navaee-Ardeh et al, 2009, Bioresource Technology 3379
6. Emerging Biodrying Technology for the Drying of Pulp and Paper Mixed Sludges. Navaee-Ardeh et al., 2006, Drying Technology, 737

SUMMARY

The present invention overcomes the limitations of composting for drying of biodegradable organic material by recovering the heat and ammonia released during the decomposition of organic matter usually lost in the moist air released to the atmosphere. This is accomplished by condensing the air moisture prior to release, recovering the heat, and returning the recovered heat back to the biologically active reacting mix. The temperature necessary for practical and efficient drying of the material is therefore maintained, in spite of very low biological rates of reaction, and consequently low heat release rates. The practice described not only makes the process energy efficient, but minimizes the loss of energy present in the organic material and speeds up the reaction rates, thus minimizing the retention time required for the compost drying process. The following equations summarize the biodecomposition of organic matter during composting and the release of water, ammonia and heat as a result:

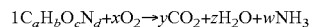

$$x=4a+b-2c-3d/4 \quad y=a \quad z=\tfrac{1}{2}b-3d \quad w=d$$

Where $C_a H_b O_c N_d$ signifies a biodegradable organic feedstock with a given amount of Carbon, Hydrogen, Oxygen and Nitrogen, $xO_2$ signifies the amount of Oxygen required for the reaction to take place, $yCO_2$ signifies the amount of Carbon Dioxide released, $zH_2O$ signifies the amount of water released by the reaction, and $wNH_3$ is the amount of ammonia produced.

At the same time, the amount of gaseous emissions from the process and their associated potential for environmental impact due to odors, dust or other volatile organic compounds are minimized. Furthermore, sub-products from the decomposition of the organic material such as ammonia and carbon dioxide are recovered.

BRIEF DESCRIPTION OF THE DRAWINGS

FIG. 9 is a graph illustrating the results of applying this invention in a prototype to drying of food waste.

FIG. 10 is a graph illustrating Temperatures during Food Waste Drying in a Prototype of this invention FIG. 11 is a graph illustrating the Relative Humidity of Circulating Air during Food Waste Drying in a Prototype of this invention

DESCRIPTION OF PREFERRED EMBODIMENTS

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Figure 1:
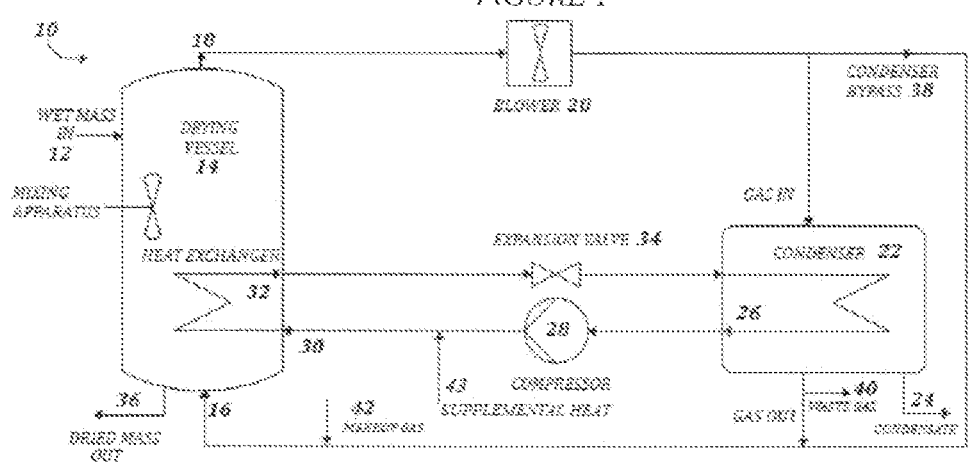
FIG. 1 illustrates a schematic view of a process for drying wet organic materials; in accordance with an embodiment of the present invention.

FIG. 1 illustrates a schematic view of one possible embodiment 10 of a continuous drying system for wet organic material which employs the use of a heat pump to recover the heat of condensation. An organic material to be dried 12 enters a drying vessel 14. A gas mixture 16 enters the drying vessel and is continually distributed throughout the organic material to be dried by the use of a mixing apparatus. The entering gas mixture provides oxygen to support biological activity in the material present in the drying vessel. The biological activity generates heat and the subsequent release of moisture from the material being dried. The gas mixture within the drying vessel incorporates the heat, ammonia and moisture produced by the biological activity within the drying vessel, and a stream of warm wet gas 18 exits the drying vessel. This warm wet gas is transported by a blower 20 and enters a condenser 22 where precipitation occurs and moisture is expelled as condensate 24. An acid might be added to the condensate to lower the pH and said condensate recirculated through the condenser to further enhanced ammonia condensation. The dried gas exits the condenser and re-enters the drying vessel as the incoming gas stream 16. Within the condenser line 26 evaporation occurs and the liquid within is transformed into its gaseous state and exits the condenser. This gas is passed through a compressor 28 where its pressure and temperature are greatly raised. At this point, supplemental heating may be applied from an outside source 43. The heated gas 30 then enters the internal portion of the heat exchanger which is located within the drying vessel where it transfers its latent heat to the contents of said vessel. The cooled gas stream 32 then passes out of the heat exchanger and through an expansion valve 34 where its temperature is lowered further, prior to re-entering the condenser.

Figure 2:
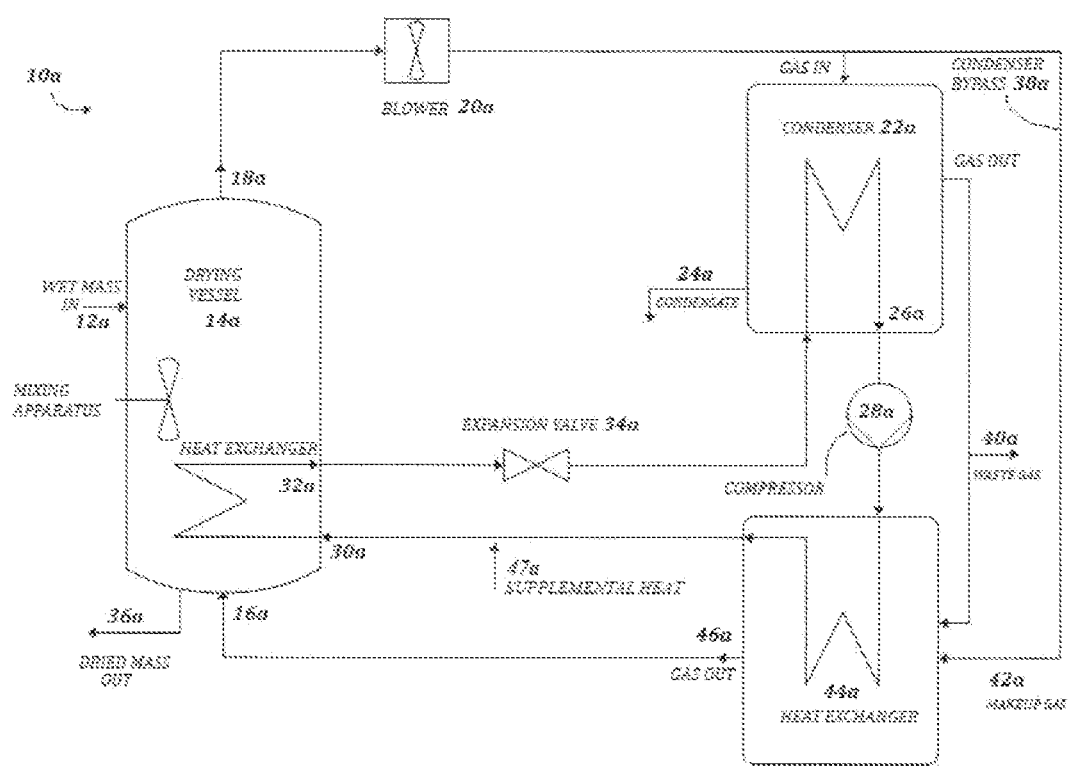
FIG. 2 illustrates a schematic view of a process for drying wet organic materials; in accordance with an embodiment of the present invention.

The process described continues until the material, in the drying vessel reaches a required moisture content at which point the dried material 36 exits the drying vessel. A condenser bypass line 38 is provided to transport the gas leaving the drying vessel via the blower 20 directly back to the drying vessel. This bypass of the condensation step is necessary to allow the accumulation of heat and moisture in the gas mixture needed for the startup of the process. The oxygen content in the gas entering the drying vessel is monitored, and a waste gas stream 40 and a makeup gas stream 42 are used to maintain the oxygen concentration required for optimal biological activity within the drying vessel FIG. 2 illustrates another embodiment of the process 10a described in FIG. 1, wherein the dried gas that exits the condenser 22a is pre-heated in an additional heat exchanger 44a prior to being returned to the drying vessel 14a. Pre-heated, dried gas 46a exits the additional heat exchanger to return to the drying vessel as the incoming gas stream 16a. Further heat transfer occurs within the drying vessel by means of the heat exchanger within the drying vessel as described in FIG. 1. Each component of the process described in FIG. 2 (12a through 42a) is identical in function to its counterpart in FIG. 1 (12 through 42), although it may be different in design. Supplemental heat 47a may be added to the fluid after exiting the heat exchanger 44a.

The purpose of the adaptation of the process 10a is to further optimize the heat transfer that will occur between the gas mixture 16a entering the drying vessel and the organic material to be dried. The moisture content within the drying vessel impedes the efficiency of heat transfer due to the loss of heat associated with evaporation of this moisture. This is particularly the case at the onset of the process. The additional heat transfer unit, therefore, provides a means of more efficiently recovering the heat gained in the compressor and making it available for use in the drying process which occurs within the drying vessel. The gas mixture 16a which enters the drying vessel after being discharged from the heat exchanger 44a is also at a higher temperature than the gas 16 introduced into the drying vessel in the embodiment of the process 10. The overall increase in heat provided to the material within the drying vessel serves to accelerate the process in embodiment 10a as compared to the process 10.

Figure 3:
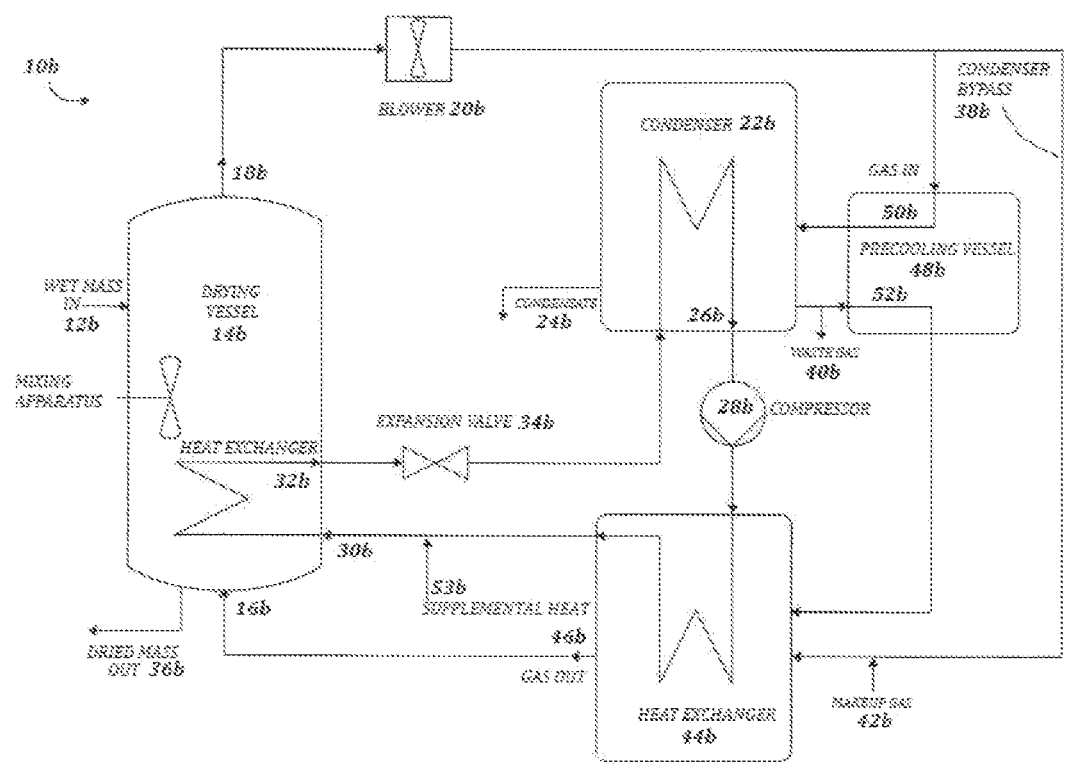
FIG. 3 illustrates a schematic view of a process for drying wet organic materials: in accordance with an embodiment of the present invention.

FIG. 3 illustrates a third possible embodiment 10b of the invention in which the warm wet gas leaving the drying vessel 14b is pre-cooled within a heat exchange vessel 48b prior to entering the condenser 22b. The cooling is accomplished by exposing the incoming warm wet gas stream 50b to the cooled dried gas stream exiting the condenser 52b as these streams pass simultaneously through the pre-cooling vessel 48b. This pre-cooling of the wet gas entering the condenser serves to optimize the removal of moisture in the condenser since less energy is needed to lower the temperature of the gas within the condenser in order for condensation to occur. With the exception of the addition of the pre-cooling heat exchange vessel 48b this embodiment of the invention 10b is identical to 10a. Each component of the process described in FIG. 3 (12b through 46b) is identical in function to its counterpart in FIG. 2 (12a through 46a), although it may be different in design. Supplemental heat 53b may be added to the fluid after exiting the heat exchanger 44b.

Figure 4:
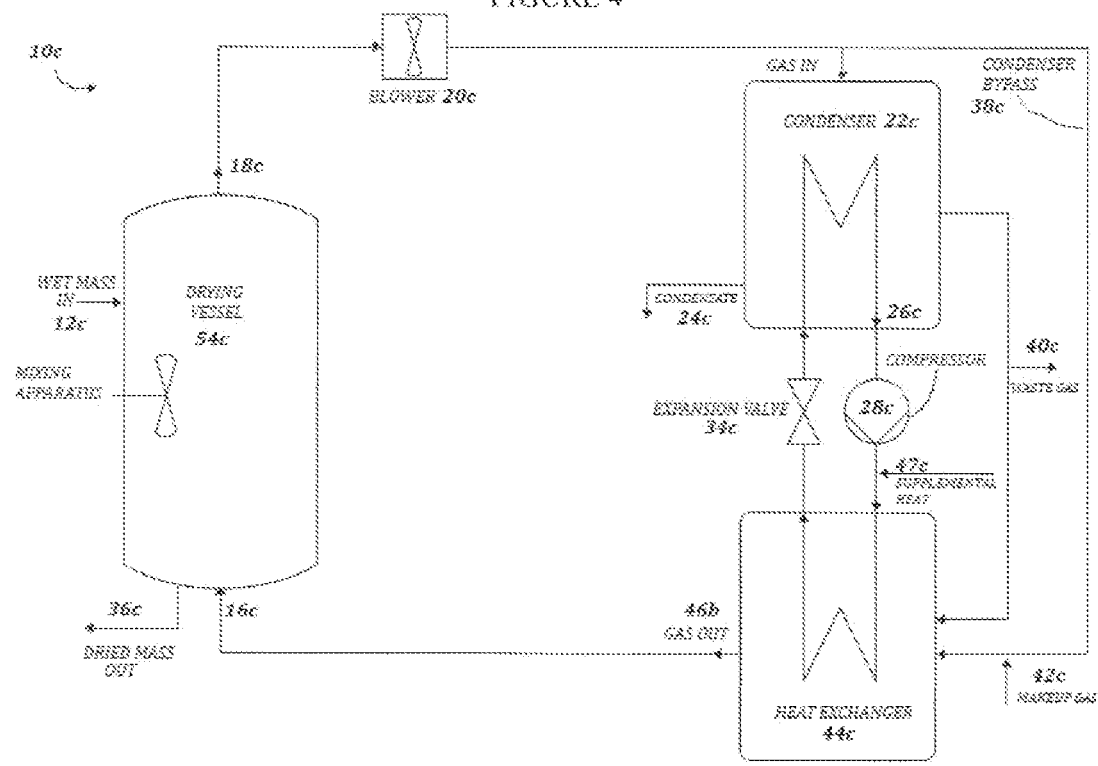
FIG. 4 illustrates a schematic view of a process for drying wet organic materials; in accordance with an embodiment of the present invention.

A fourth possible embodiment 10c is illustrated in FIG. 4, which is identical to embodiment 10a illustrated in FIG. 2, except that there is no heat exchanger within the drying vessel 54c. Furthermore, a supplemental heat source 47c may be incorporated tor increased heat transfer. In this embodiment, heat transfer occurs by direct contact of the gas mixture 16c with the material within the drying vessel. Each of the components described in FIG. 4 (12c through 46c), is identical in function to its counterpart in FIG. 2 (12a through 46a), although it may be different in design. The process configuration 10c would simplify the design of the drying vessel at the expense of efficiency of heat transfer as compared to the configuration 10a illustrated in FIG. 2.

Figure 5:
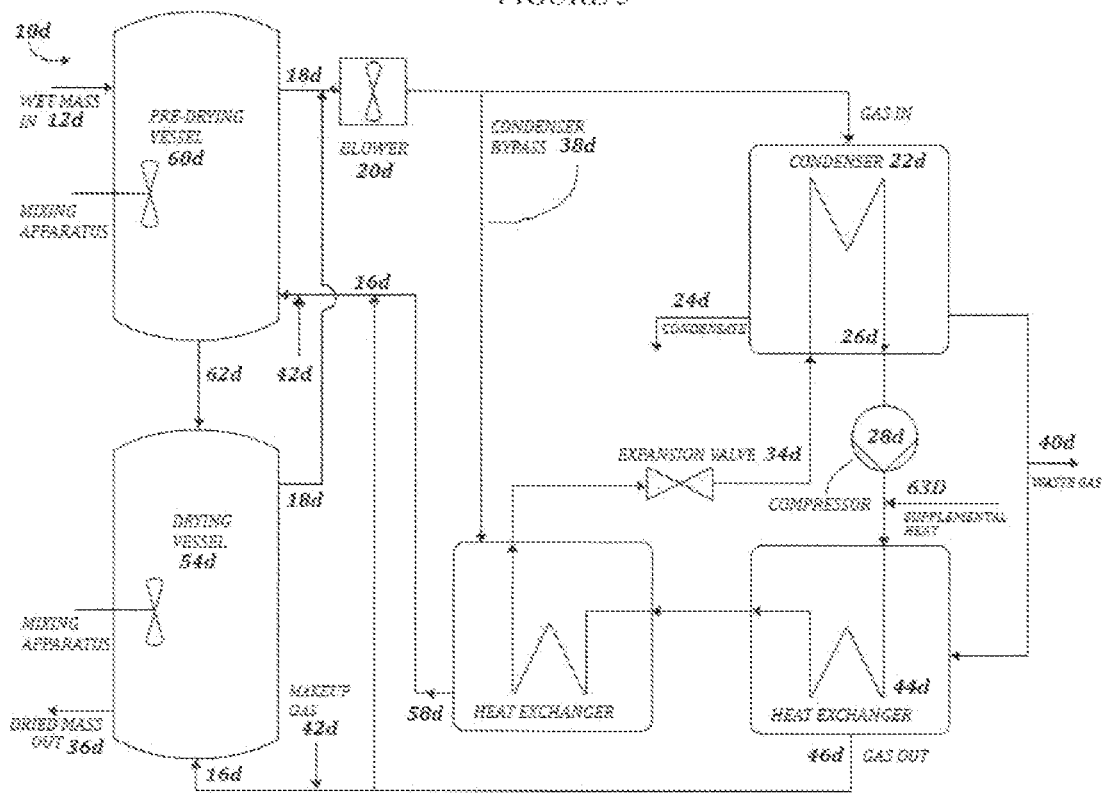
FIG. 5 illustrates a schematic view of a process for drying wet organic materials; in accordance with an embodiment of the present invention.

FIG. 5 illustrates yet another possible embodiment of the invention 10d in which a pre-drying vessel 60d is implemented for optimization of the drying process. Partially dried organic material 62d is passed from the pre-drying vessel, to a final drying vessel 54d. The embodiment of the invention 10d maximizes heat transfer between the heated dried gas and the material within the drying vessel due to the decreased moisture content within the final drying vessel 54d. Each of the components described in FIG. 5 (12d through 46d) is identical in function to its counterpart in FIG. 4 (12c through 46c), although it may be different in design. Supplemental heat 63d may be added to the fluid after exiting the heat exchanger 44d.

In this configuration, the condenser bypass line 38d enters an additional heat exchanger 56d where the temperature of the wet gas mixture is increased without the removal of moisture prior to its re-entering the pre-drying vessel 60d. The bypass line is used during initial startup and when a new hatch of material is added to the pre-drying vessel while pre-dried material is being processed concurrently in the final drying vessel. In normal operation, the wet gas mixture leaves the pre-drying vessel and passes through the condenser 22d and a heat exchanger 44d. The use of separate heat exchangers 56d and 44d for the two streams of gas leaving the pre-drying vessel allows for optimal retention of moisture in the case of the condenser bypass line 38d, and optimal drying in the case of the gas which passes through the condenser. The dried heated gas 46d which exits the heat exchanger 44d becomes the inlet gas mixture 16d for the pre-drying vessel 60d and the final drying vessel 54d. The heal and water from the moist material in the final drying vessel is combined with that from the pre-drying vessel 18d and follows the process previously described.

Figure 6:
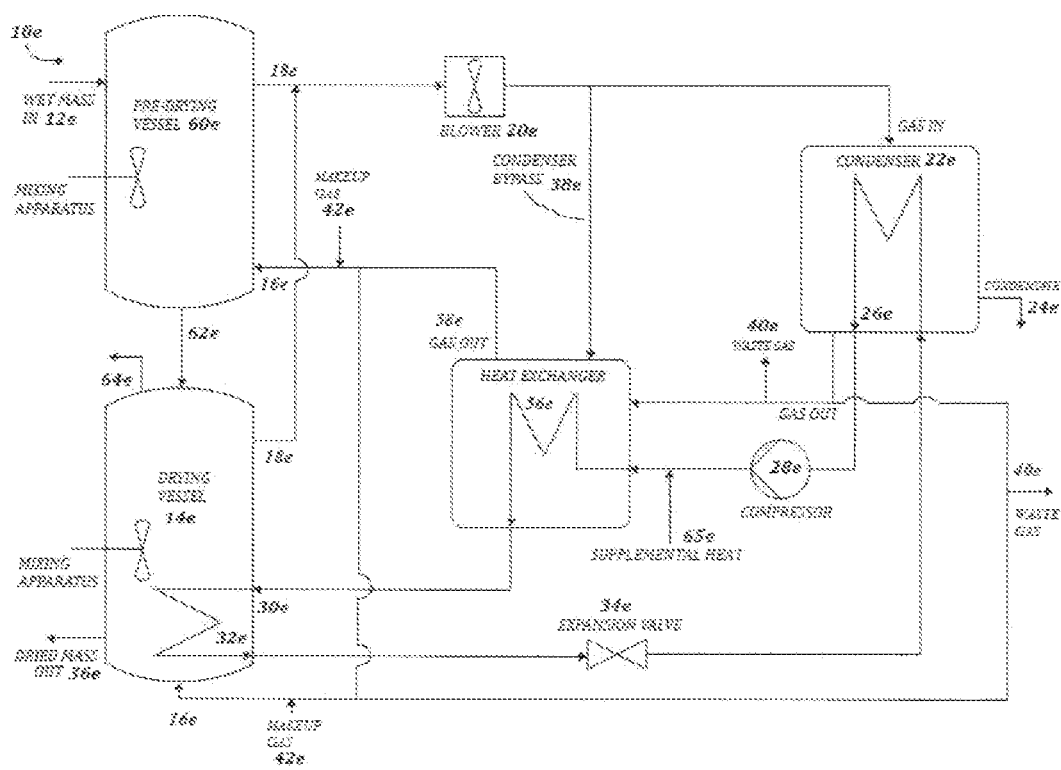
FIG. 6 illustrates a schematic view of a process for drying wet organic materials; in accordance with an embodiment of the present invention.
Figure 7:
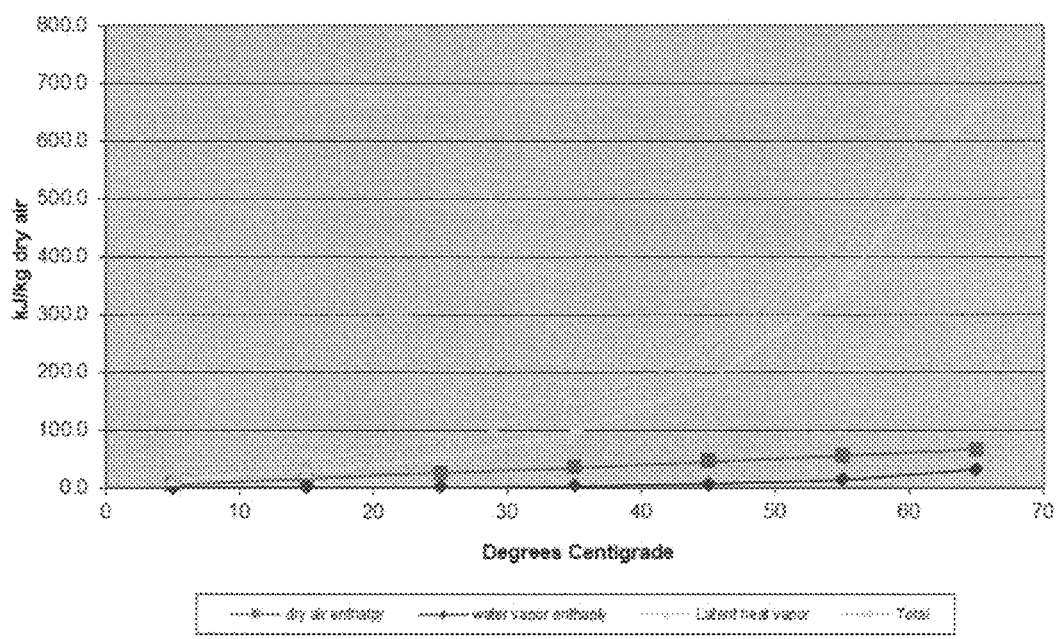
FIG. 7 is a graph showing the factors contributing to the total energy present in moist air
Figure 8:
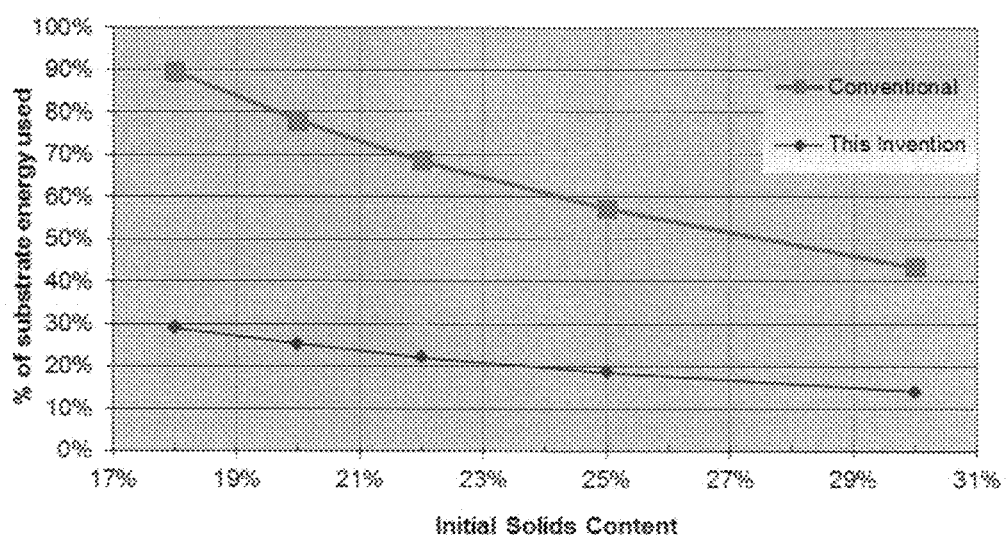
FIG. 8 is a graph showing data that describes the impact of drying on energy recovery in the substrate

In another embodiment of the invention 10e, illustrated in FIG. 6, a drying vessel with an internal heat exchanger, as in embodiments 10, 10a and 10b (See FIG. 1. FIG. 2 and FIG. 3), is used as the final drying vessel. The flow of the gas mixture through the pre-drying vessel 60e in this embodiment of the invention is identical to that of the drying vessel 54c described for embodiment 10c in FIG. 4. Each of the components described in FIG. 6 (12e through 46e) is identical in function to its counterpart in FIG. 4 (12c through 46c), although it may be different in design. Supplemental hear 65e may be added to the fluid after exiting the heat exchanger 56e.

This embodiment is identical to embodiment 10d illustrated in FIG. 5 in that it makes use of a pre-drying vessel 60e from which partially dried material 62e is passed to the final drying vessel 14e in order to optimize the removal of moisture from the material to the dried. Heat for the drying process in the final drying vessel 14e is provided by heat transfer by the heat exchange unit within said drying vessel FIG. 9 illustrates data obtained in testing the present invention in a pilot scale prototype. The prototype consisted of a rotating drum biodrying reactor connected to a compression heat pump that recirculated air in an out of the dryer unit. The Biodryer was fed food waste that was previously macerated to size of ¼ of an inch. Samples of the food waste mixture were taken, from the dryer over time and analyzed in the laboratory to obtain moisture content. The results are presented in FIG. 9. It is clear that the drying process took place significantly faster than reported for other Biodrying experiences. It takes usually 5 to 10 days to reduce moisture from 75% to 30%. Here the process occurred in a matter of hours, FIG. 10 illustrates the on-line measurements of temperatures in the prototype during the same run presented in FIG. 9. The temperature in the mixture rose to 30 C and equilibrium was reached between the reacting mixture and the surrounding air. Heat of condensation was transferred from the dry air returning front the heat pump at a temperature close to 45 C. The water evaporation during the drying process cools the mixture and the air somewhat.

FIG. 11 illustrates the relative humidity of the air circulating in and out of the Biodryer during the same prototype run as in FIGS. 9 and 10. The warm, air coming from the heat pump was dry with a low, 10%, relative humidity, while the air out of the unit was moist with a relative humidity of 60%. This illustrates the correct functioning of the unit. Moisture is removed from the moist organic reacting material and conducted to the cold side of the heat pump for condensation. Air is dried and heated and returned to the unit to recover the heat of condensation.

It is to be appreciated that various alterations, modifications, and improvements will readily occur to those skilled in the art. Such alterations, modifications, and improvements are intended to be part of this disclosure, and are intended to be within the spirit and scope of the disclosure. In some embodiments, an existing system or method may be modified to implement or incorporate any one or more aspects of the disclosure. Thus, some embodiments may involve configuring an existing composting system or method to include the integration described herein. For example, an existing composting system or process may be retrofitted to harvest energy therefrom in accordance with one or more embodiments. Accordingly, the foregoing description and drawings are by way of example only. Further, the depictions in the drawings do not limit the disclosures to the particularly illustrated representations.

What is claimed is:

1. A method for drying particulate organic biodegradable material comprising:

blending the particulate organic biodegradable material with other materials to produce an organic mix that generates biological activity in the presence of oxygen;

contacting the organic mix with a gas stream containing oxygen and allowing the organic mix to decompose biologically, producing a decomposing blended mixture and generating heat;

circulating the gas stream across the decomposing blended mixture and incorporating water vapor and other gases comprising ammonia and carbon dioxide to produce a vapor laden gas stream;

conveying at least a portion of the vapor laden gas stream to a condensing stage;

condensing at least a portion of the vapor laden gas stream to reduce a moisture content of the vapor laden gas stream and transfer heat of condensation to a condensing surface, forming a dried gas stream and condensed liquid;

returning at least a portion of the dried gas stream to the decomposing blended mixture or a new organic mix;

removing the condensed liquid from the condensing stage; and transferring at least a portion of the heat of condensation from the condensing surface to the decomposing blended mixture or the new organic mix.

2. The method of claim 1, further comprising transferring at least a portion of the heat of condensation to the gas stream.

3. The method of claim 1, further comprising transferring at least a portion of the heat of condensation to the dried gas stream.

4. The method of claim 1, wherein the portion of the heat of condensation from the condensing surface is indirectly transferred to the decomposing blended mixture or the new organic mix.

5. The method of claim 1, wherein the decomposing blended mixture is allowed to react by itself in a batch mode.

6. The method of claim 1, further comprising continuously or semi-continuously blending the decomposing blended mixture with the new organic mix.

7. The method of claim 1, further comprising supplementing the heat of condensation with external heat from a different source.

8. The method of claim 1, further comprising removing at least a portion of the gas stream or vapor laden gas stream and replacing the removed portion with fresh gas containing oxygen.

9. The method of claim 1, further comprising condensing the ammonia in the vapor laden gas stream with addition of an acid.

10. The method of claim 9, further comprising removing the condensed ammonia with the removal of the condensed liquid.

11. A system for drying organic material comprising:

a drying vessel configured to contain an organic mix that generates biological activity in the presence of oxygen, the drying vessel having an inlet connectable to a gas stream containing oxygen and an outlet configured to convey a vapor laden gas stream comprising water vapor, ammonia, and carbon dioxide;

a heat pump subsystem thermally connected to the drying vessel and configured to recover heat of condensation from the vapor laden gas stream and return at least a portion of the heat of condensation to the drying vessel;

a gas circulation line extending between the outlet of the drying vessel and the heat pump subsystem configured to convey at least a portion of the vapor laden gas stream to the heat pump subsystem;

a return gas line extending between the heat pump subsystem and the inlet of the drying vessel configured to return at least a portion of a dried gas stream to the drying vessel; and a blower configured to circulate at least one of the vapor laden gas stream and the dried gas stream.

12. The system of claim 11, further comprising an external heat source configured to supplement the heat of condensation being returned to the drying vessel.

13. The system of claim 11, wherein the heat pump subsystem comprises a compression heat pump, an absorption heat pump, or a thermoelectric heat pump.

14. The system of claim 11, wherein the heat pump subsystem is configured to condense water vapor and ammonia from the vapor laden gas stream.

15. The system of claim 11, wherein the gas circulation line is configured to add an acid to the vapor laden gas stream.

* * * * *